(12) United States Patent
Kang et al.

(10) Patent No.: US 8,929,107 B2
(45) Date of Patent: Jan. 6, 2015

(54) ACTIVE SURGE PROTECTION IN A POWER SUPPLY

(75) Inventors: Douglas Min Kang, San Jose, CA (US); Jose Requinton Del Carmen, Jr., San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 577 days.

(21) Appl. No.: 13/278,535

(22) Filed: Oct. 21, 2011

(65) Prior Publication Data

US 2013/0100710 A1   Apr. 25, 2013

(51) Int. Cl.
*H02H 7/125*    (2006.01)
*H02H 1/00*     (2006.01)
*H02H 9/04*     (2006.01)
*H02M 1/32*     (2007.01)
*H02H 9/00*     (2006.01)

(52) U.S. Cl.
CPC ............... *H02H 7/125* (2013.01); *H02H 9/04* (2013.01); *H02M 1/32* (2013.01); *H02H 9/005* (2013.01)
USPC .............................................. 363/53; 361/118

(58) Field of Classification Search
CPC .................... H02M 1/32; H02H 9/04
USPC .............. 363/50, 52, 53; 361/91.1, 91.5, 111, 361/118
See application file for complete search history.

(56) References Cited

U.S. PATENT DOCUMENTS

| | | | |
|---|---|---|---|
| 4,573,113 A | | 2/1986 | Bauman |
| 5,621,625 A | * | 4/1997 | Bang ........................... 363/21.1 |
| 6,952,354 B1 | * | 10/2005 | Yang et al. ...................... 363/16 |
| 2013/0044523 A1 | * | 2/2013 | Hsiao et al. ..................... 363/52 |
| 2013/0114175 A1 | * | 5/2013 | Song ............................... 361/86 |

* cited by examiner

*Primary Examiner* — Matthew Nguyen
(74) *Attorney, Agent, or Firm* — Blakely Sokoloff Taylor & Zafman LLP

(57) ABSTRACT

A surge protection module is disclosed. An example surge protection module includes a first terminal coupled to a first output terminal of a rectifier of a power supply. A second terminal is coupled to a first input terminal of a switching converter of the power supply. A third terminal is coupled to a second output terminal of the rectifier and a second input terminal of the switching converter. A variable resistance circuit is coupled between the first and second terminals. A control circuit is coupled between the first and third terminals and coupled to control the variable resistance circuit. A resistance of the variable resistance circuit is responsive to a magnitude of a voltage between the first and third terminals.

23 Claims, 6 Drawing Sheets

ACTIVE SURGE PROTECTION IN A POWER SUPPLY

BACKGROUND INFORMATION

1. Field of the Disclosure

The present invention relates generally to protection of power supplies, and more specifically, relates to surge protection at the input port of switch mode power supplies.

2. Background

In a typical application, an ac-dc power supply receives an input that is between 100 and 240 volts rms at a relatively low frequency that is nominally either 50 Hz or 60 Hz from an ordinary ac electrical outlet. The ac input voltage is usually rectified within the power supply to become a source of unregulated dc voltage for use by a dc-dc switching power converter. Switches in the power converter are typically switched on and off at a relatively high frequency (tens or hundreds of kilohertz) by a control circuit to provide a regulated output that may be suitable for operating an electronic device, or for charging a battery that provides power to an electronic device.

Many off-line household or industrial appliances require a regulated direct current (dc) source for their operation and often utilize different types of ac/dc switch mode power supplies to convert low frequency (e.g., 50 Hz or 60 Hz) alternating current (ac) voltage at input mains to a regulated dc output voltage or current at the output of the power supply for load operation. Switch mode power supplies are popular because of their small size due to high frequency operation, high efficiency, well-regulated outputs and the safety and protection features that are provided. One of most important protections for the ac/dc or as called the off-line power supplies due to their exposure to the power line surges that could destroy the power supply and the sensitive loads coupled to their output is the surge protection.

In general, a switch mode power supply includes a switching element accompanied with an energy transfer element, such as for example a high frequency transformer that transforms the input voltage level to a usually lower output voltage level and can serve as safety isolation as well. The output of the transformer is then rectified and filtered to provide a regulated dc output voltage or current to be provided to load.

An important recent application that utilizes switch mode power supplies is the lighting of high efficiency light sources. Such example applications include electronic ballasts for fluorescent or other discharge lamps, LED drivers and so on. LEDs have been very popular due to their longer life and their recent performance improvements in light spectrum (color), Volt-Ampere characteristics and Lumens per Watt delivery.

Safe and efficient LED drivers have recently been of great attention in the lighting industry. Off-line LED drivers can be exposed to ac power network surge pulses due to lightning or other interruptions. One safety feature that can be provided in LED drivers is surge protection device (SPD) at the input stage of the power supply. SPDs can be of different types, such as metal oxide varistors (MOVs), transient voltage suppression (TVS) diodes, thyristor surge protection devices (TSPDs) or so on.

Common input stages and interfaces included in ac-dc power supplies with the 50/60 Hz power networks include a diode bridge rectifier followed by a filter capacitance. To filter out the low frequency 120 Hz ripple of the full wave rectified input voltage, a bulk electrolytic capacitor may also be included. A bulk aluminum electrolytic filter capacitor at the input of an LED driver could be a weak point that affects the lifetime and maintenance of a driver circuit. The bulk aluminum electrolytic filter capacitor could be used to suppress and limit accidental peak surges and thus could be used as a surge protector of surges of 1 kV or less. However, in order to accommodate the extended lifetsime of the LED drivers, it is preferred in circuit design to avoid any electrolytic capacitances, which generally have shorter lifespans, and replace them with small long life capacitors.

In some power supply applications, a power factor correction (PFC) controller is included the power supply in order to comply with power factor regulations. In power supplies that include the PFC controllers, the input full wave rectified sine wave is required for operation of the PFC controller. Thus, the low frequency filter capacitance is removed or replaced with a very small capacitance in order to smooth the switching noise in the input full wave rectified sine wave. With a small filter capacitance at the power supply input after the bridge rectifier, the power supply is more susceptible to very high peak surge pulses up to several kV (~4 kV) and surge protection at a reasonable cost is not available.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses that provide an inexpensive active surge protection circuit are disclosed. In various examples, the disclosed surge protection circuits provide an efficient way to provide surge protection from surges up to 4 kV or more at the input or front stage of power supplies designed with small or no filter capacitances after the input rectifier. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In the ac-dc switch mode power supplies without a bulk capacitor after the bridge rectifier, as an example for the off-line power supplies with power factor correction PFC, that the ac line half sine wave after bridge rectifier is required for the current shaping, the lack of a bulk capacitor (that otherwise could soften the surge spike) increases risk of exposure to higher surge spikes at input port of switching converter 140. Such a risk brings a necessity of a higher level of surge protection at the inputs of such power supplies. There are wide applications of ac-dc off-line switch mode power supplies with PFC in the residential and commercial appliances and lighting industry specifically forms a wide growing market for the off-line PFC switch mode power supplies that more specifically at recent days LED driver is an important section of it.

Figure 1:
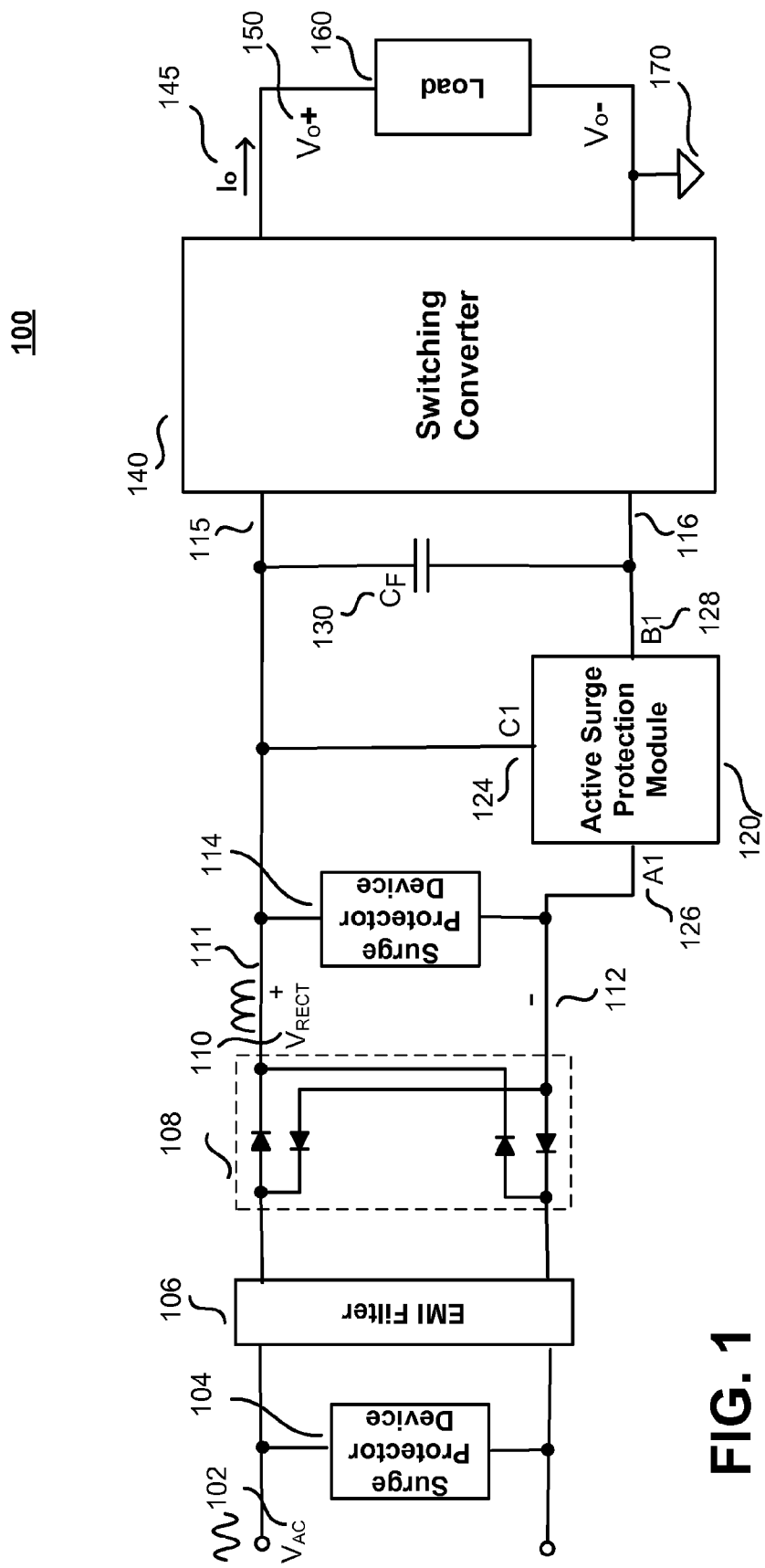
FIG. 1 is an example block diagram illustrating a switching power supply with an active surge protection module included in the low side bus of a power supply in accordance with the teachings of the present invention.

To illustrate, FIG. 1 shows a general block diagram of an example switch mode power supply 100. As shown in the depicted example, power supply 100 has an input coupled to receive an input ac signal Vac 102, which is coupled to be received by an optional surge protector device SPD 104 and an electromagnetic interference (EMI) filter block 106. In one example, EMI filter block 106 may include common mode (CM) and differential mode (DM) noise filters made up of inductors and X & Y capacitors. A bridge rectifier 108 is coupled to the outputs of EMI filter 106 and another optional SPD 114 is coupled to the outputs of rectifier 108. In one example, the optional SPDs 104 and 114 may be typical off-the-shelf SPDs that include metal oxide varistors (MOVs), transient voltage suppression (TVS) diodes, thyristor surge protection devices (TSPDs) or the like. Typical off-the-shelf SPDs included in power supplies at input an interface to the ac network as well as after the bridge rectifier 108 at the rectified dc input. However, typical off-the-shelf cost effective SPDs are usually rated for surge protection levels up to only 1 kV, which by themselves may be insufficient for applications such as military applications and the more restricted regulatory standards in which a surge peak spikes of 4 kV may be foreseeable.

As shown in the illustrated example, power supply 100 also includes an active surge protection module 120 that is assembled at the interface of the output of rectifier 108 to the input of a switching converter 140. Specifically, in depicted example, rectifier 108 includes output terminals 111 and 112 and switching converter 140 includes input terminals 115 and 116. In addition, active surge protection module 120 includes terminals A1 126, B1 128 and C1 124. As shown, terminal A1 126 of surge protection module 120 is coupled to terminal 112 of rectifier 108, terminal B1 128 of surge protection module 120 is coupled to terminal 116 of switching converter 140 and terminal C1 124 of surge protection module 120 is coupled to terminal 111 of rectifier 108 as well as terminal 115 of switching converter 140.

In the example illustrated in FIG. 1, terminals 111 and 115 are coupled to a high side bus of power supply 100 and terminals 112 and 116 are coupled to a low side bus of power supply 100. An optional small value high frequency filter capacitor $C_F$ 130 coupled between the high side bus and low side bus as shown. In the example, surge protection module 120 is assembled at the low side bus between the output of bridge rectifier and the input of the switching converter 140. It is noted that, depending on the application, there may be an extra high frequency inductor/capacitor LC filter, or as shown in FIG. 1, only capacitor filter $C_F$ 130 added at the input of switching converter 140.

In one example, switching converter 140 is made up of multiple sections, which include sections for high frequency (HF) switching, storing and transferring energy to the output during each switching action, and then rectifying and filtering the switching ripples to provide a smooth dc output voltage $V_o$ 150 and dc output current $I_o$ 145 to the load 160.

Figure 2:
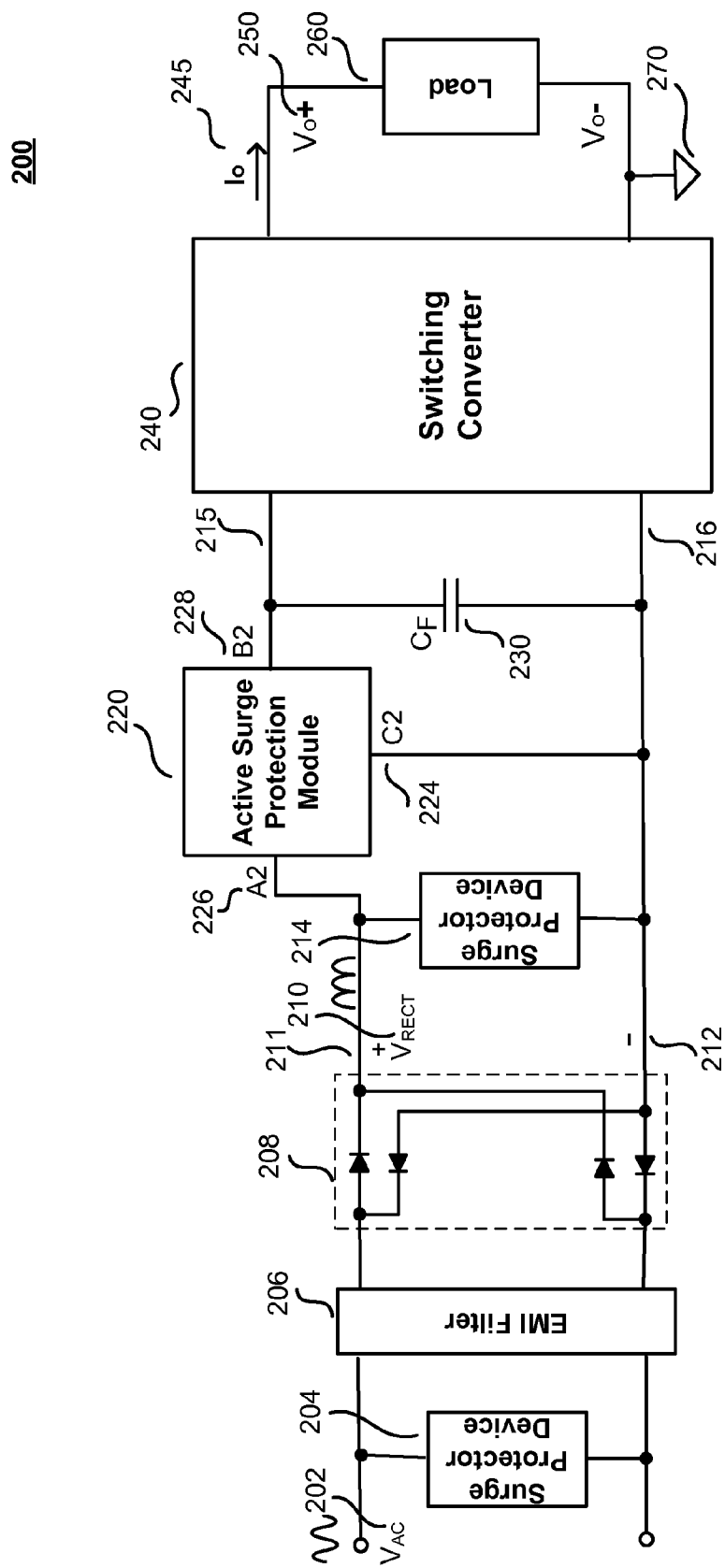
FIG. 2 is an example block diagram illustrating a switching power supply with an active surge protection module included in the high side bus of a power supply in accordance with the teachings of the present invention.

FIG. 2 is an example power supply 200, which is an alternate example of power supply 100 illustrated in FIG. 1. In particular, FIG. 2 show an active surge protection module 220 having terminals A2 226, B2 228 and C2 224 coupled to output terminals 211 and 212 of rectifier 208 and input terminals 215 and 216 of switching converter 240 as shown on the high side bus of power supply 200. Specifically, in the illustrated example, terminals 211 and 215 are coupled to the high side bus of power supply 200 and terminals 212 and 216 are coupled to the low side bus of power supply 200. In the illustrated example, there is no bulk capacitor and there is only an optional small high frequency filter capacitor $C_F$ 230 coupled between the high side bus and the low side bus of power supply 200. As a result, the rectified full-wave voltage Vrect 210 between terminals 211 and 212 has a fully rectified sinusoidal wave shape in the illustrated example.

As shown in the example illustrated in FIG. 2, the surge protection module 220 is assembled at the high side bus as shown. In particular, terminal A2 226 of surge protection module 220 is coupled to terminal 211 of rectifier 208, terminal B2 228 is coupled to terminal 215 of switching converter 240, and terminal C2 224 is coupled to terminal 212 of rectifier 208 as well as terminal 216 of switching converter 240. As mentioned with regard to power supply 100 of FIG. 1, depending on the specific application, power supply 200 may require an extra LC or C noise filter at the input of switching converter 240, as depicted by $C_F$ 230 in FIG. 2.

As mentioned with regard to power supply 100 of FIG. 1, the switching converter 240 of FIG. 2 also may include multiple sections including a high frequency HF switching section, an energy transfer element to store and transfer energy during each switching action, and a section for providing a smooth dc output voltage $V_o$ 250 and dc output current $I_o$ 245 to the load 260 by rectifying and filtering HF ripples from switching converter 240.

Figure 3:
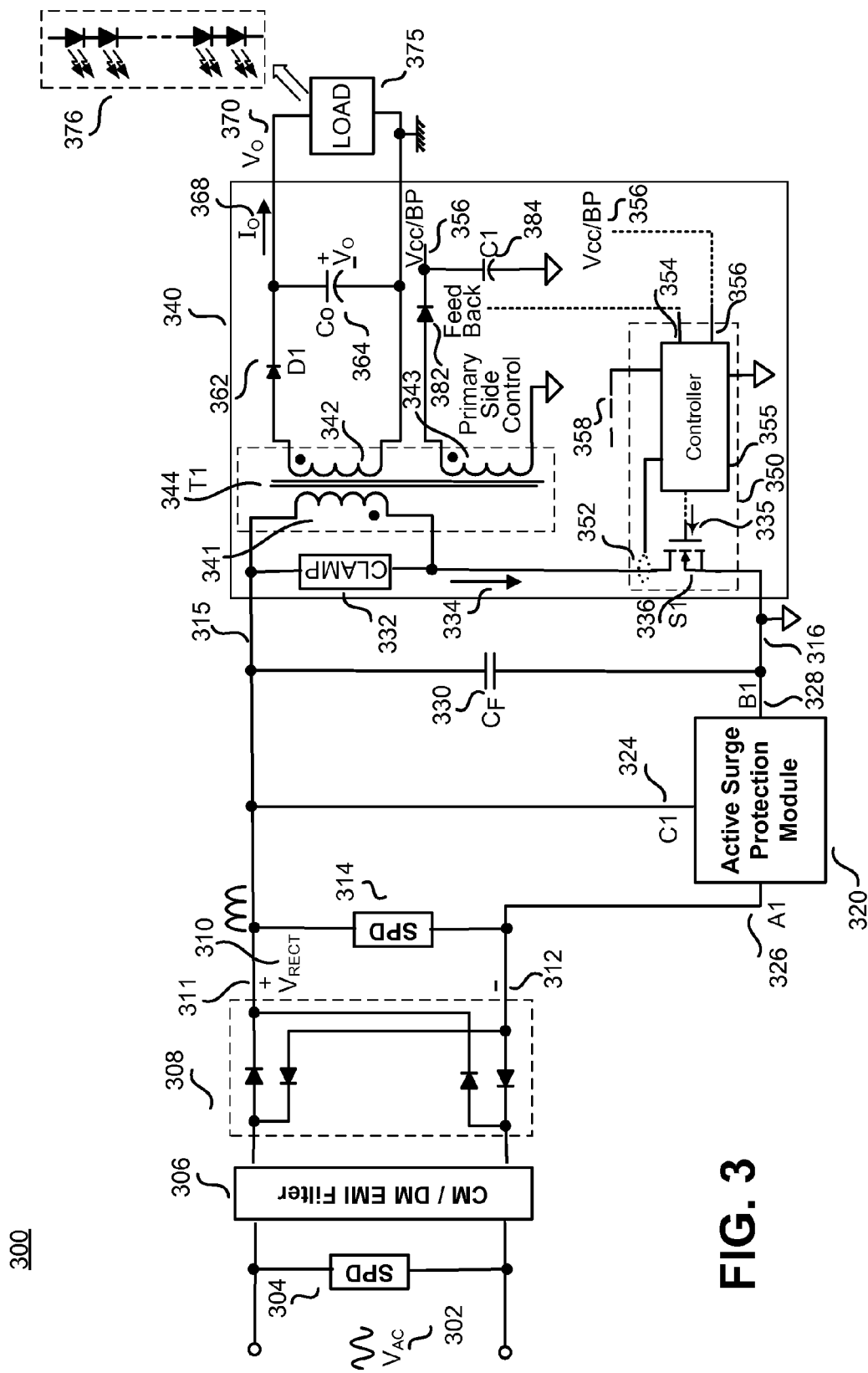
FIG. 3 illustrates an example active surge protection module included in the low bus of a power supply including an example switching converter having a switching element, a controller, an energy transfer element and an output load, in accordance with the teachings of the present invention.

FIG. 3 illustrates an example active surge protection module included in the low side bus of a power supply including an example switching converter having a switching element, a controller, an energy transfer element and an output load, in accordance with the teachings of the present invention. In particular, power supply 300 includes an active surge protection module 320 that is assembled at the interface of the output of rectifier 308 to the input of a switching converter 340. Specifically, in depicted example, rectifier 308 includes output terminals 311 and 312 and switching converter 340 includes input terminals 315 and 316. In addition, an active surge protection module 320 includes terminals A1 326, B1 328 and C1 324. As shown, terminal A1 326 of surge protection module 320 is coupled to terminal 312 of rectifier 308, terminal B1 328 of surge protection module 320 is coupled to terminal 316 of switching converter 340 and terminal C1 324 of surge protection module 320 is coupled to terminal 311 of rectifier 308 as well as terminal 315 of switching converter 340.

In the example of FIG. 3 switching converter 340 is illustrated as a flyback converter with a primary control. Energy transfer element T1 344 stores and transfers energy from the primary winding 341 to secondary winding 342 at each switching action of a power switch S1 336, which is controlled by controller 335. It is noted that energy transfer element T1 344 may also be referred to in this disclosure as a transformer T1 344. In one example, power switch S1 336 and controller 355 may be included in a single integrated circuit 350. In the illustrated example, controller 355 receives input signals including sensed switch current 352, input line information signal 358, output information from a feedback (FB) signal 354 received through the third winding 343 of transformer 344. The FB signal 354 through the third winding 343 received by controller 355 can be either an ac or dc signal. In the example illustrated in FIG. 3, the FB signal 354 is taken from the ac side of third winding 343 before rectification through rectifier 382. The third winding 343 of transformer T1 344 also provides the dc supply Vcc through diode rectifier 382 and filter capacitor C1 384 to the controller Bypass pin, BP 356. In response to the input signals, controller 355 outputs the gating signal 335 to drive and control the On-Off time of power switch 336 to control the transfer of energy from the input of the power supply to the output of the power supply.

The HF pulses at secondary winding 342 are rectified by diode D1 362 and filtered by the bulk output capacitor Co 364 to provide regulated smooth output voltage Vo 370 and output current Io 368 to the load 375, which in one example application could be an LED string 376 as shown. In the illustrated example, no bulk capacitance is present at input of switching converter 340 and a small HF noise filter capacitance, which is illustrated in FIG. 3 as capacitor $C_F$ 330 coupled between terminals 315 and 316, is optional. It is appreciated that in some applications, instead of a single filter capacitance $C_F$ 330, a HF noise filter including an inductance and a capacitance (i.e., an LC filter) may be utilized. As shown in FIG. 3, the input stages are similar to those illustrated in the examples of FIG. 1 and FIG. 2, including a bridge rectifier 308, a common mode/differential mode EMI filter 306 and the optional SPDs 304 and 314.

In the example, active surge protection module 320 activates whenever the magnitude of the voltage of a peak surge spike between the high side bus and the low side bus of power supply 300 exceeds the threshold voltage of tolerance. Upon activation, surge protection module 320 suppresses and diverts any excessive surge energy back to the network return in accordance with the teachings of the present invention.

Figure 4:
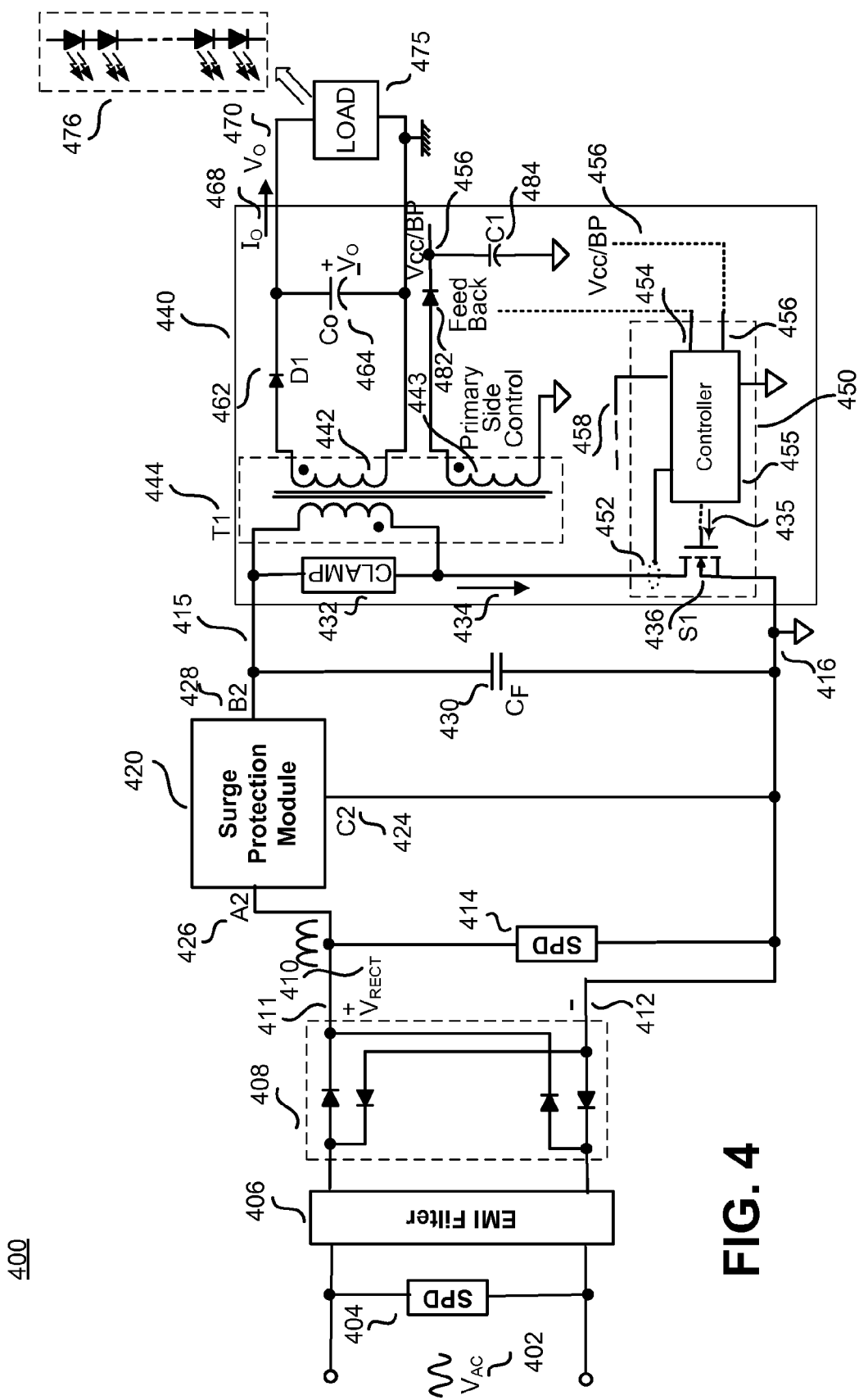
FIG. 4 illustrates another example of switching power supply such as the switching power supply example of FIG. 3 with an example active surge protection module included in the high side bus of a power supply in accordance with the teachings of the present invention.

FIG. 4 illustrates an example active surge protection module included in the high side bus of a power supply including an example switching converter having a switching element, a controller, an energy transfer element and an output load, in accordance with the teachings of the present invention. In particular, power supply 400 includes an active surge protection module 420 that is assembled at the interface of the output of rectifier 408 to the input of a switching converter 440. Specifically, in depicted example, rectifier 408 includes output terminals 411 and 412 and switching converter 440 includes input terminals 415 and 416. In addition, an active surge protection module 420 includes terminals A2 426, B2 428 and C2 424. As shown, terminal A2 426 of surge protection module 420 is coupled to terminal 411 of rectifier 408, terminal B2 428 of surge protection module 420 is coupled to terminal 415 of switching converter 440 and terminal C2 424 of surge protection module 420 is coupled to terminal 412 of rectifier 408 as well as terminal 416 of switching converter 440.

Thus, it is appreciated that FIG. 4 in a same way depicts the example arrangement of FIG. 2 with more detail of an example primary control flyback converter as the switching converter 340. As shown, a power switch S1 436 is controlled by controller 455 and at each switching action stores and transfers energy from the primary side to secondary side of transformer T1 444. Power switch S1 436 and controller 435 can be included in a single integrated circuit 450. Controller 455 receives the input signals including a sensed switch current 452, an input line signal 458 and output feedback (FB) signal 454 through the third winding 443 of transformer T1 444 and outputs the gating signal 435 to drive and control the power switch 436 On-Off time to control the transfer of energy from the input of the power supply to the output of the power supply. The FB signal 454 received by controller 455 in example of FIG. 4 is an ac signal through the third winding 443. However, in other examples, controller 455 may receive a rectified dc signal as the FB signal 454. In the illustrated example, the rectified voltage of third winding 443 of transformer T1 444 through the diode rectifier 482 and filter capacitor C1 484 also provides the dc supply (Vcc) to the controller "Bypass Pin" BP 456.

The HF pulses at secondary winding 442 are rectified and filtered through diode D1 462 and bulk output capacitor Co 464 to provide the smooth regulated output voltage Vo 470 and output current To 468 to the load 475, which in some examples may be an LED string 476 as shown. It is noted that in the example shown in FIG. 4, there is no bulk capacitance present at the input of switching converter 440 and the optional small HF noise filter, which is illustrated in FIG. 4 by capacitance $C_F$ 430 coupled between terminals 415 and 416, has no effect on limiting the surge peak spike between the high side bus and the low side bus of the power supply 400.

It is appreciated that the input stage of the example power supply 400 illustrated in FIG. 4 is similar to the input stages of the example power supplies illustrated in FIGS. 1 to 3, and thus includes the conventional simplified blocks of a bridge rectifier 408, common mode/differential mode EMI filter 406 and the optional SPDs 404 and 414. In the example, The active surge protection module 420 activates whenever the magnitude of the voltage of a peak surge spike between the high side bus and the low side bus of power supply 400 exceeds a threshold of tolerance, which is defined by the surge protection module 420 and upon activation diverts the path of surge current to a dissipative path and suppresses excessive surge energy, thus protecting the main switching power supply 400 in accordance with the teachings of the present invention.

Figure 5:
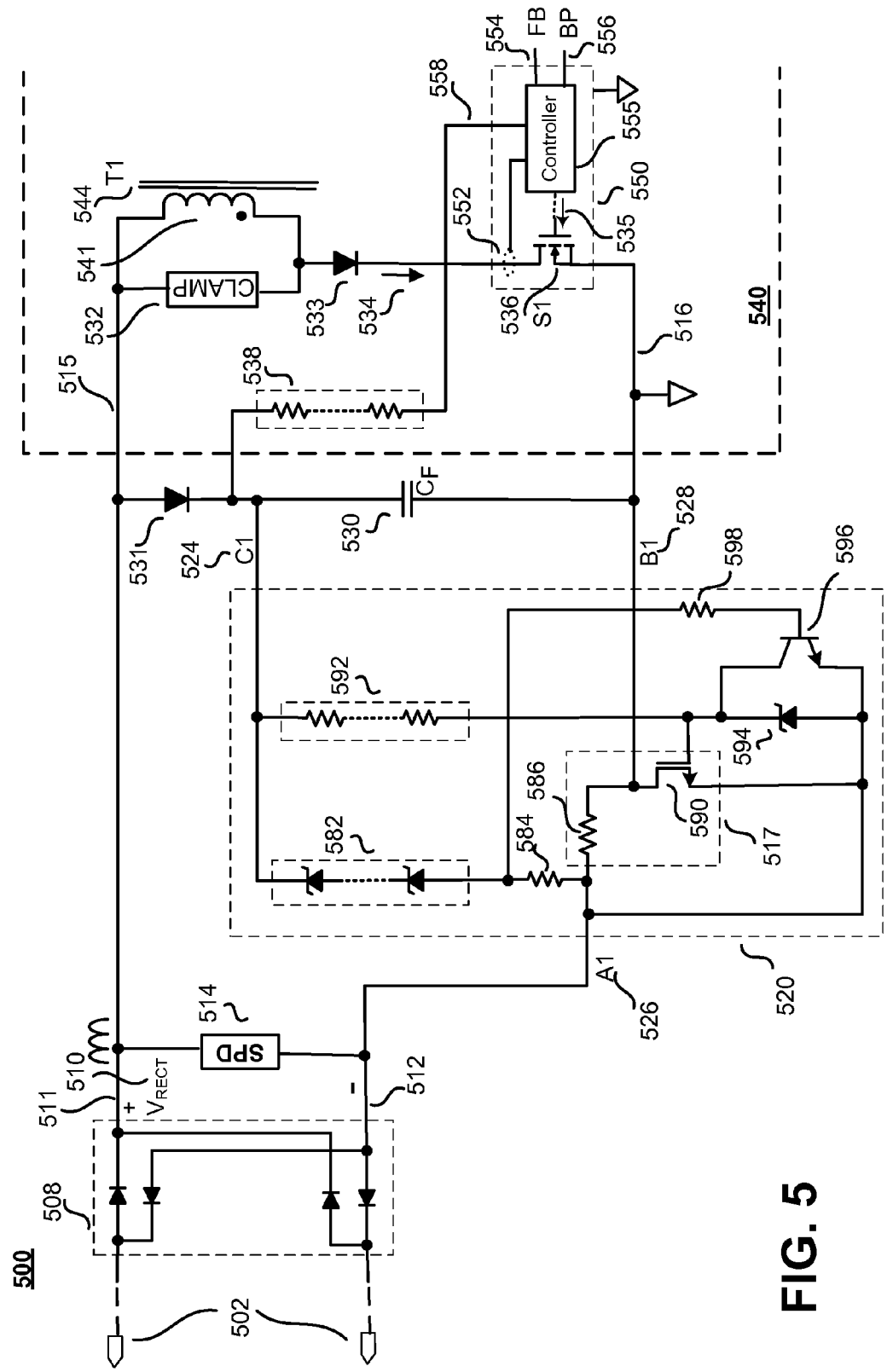
FIG. 5 illustrates a detailed example of internal circuitry of an example active surge protection module included in the low side bus of a power supply in accordance with the teachings of the present invention.
Figure 6:
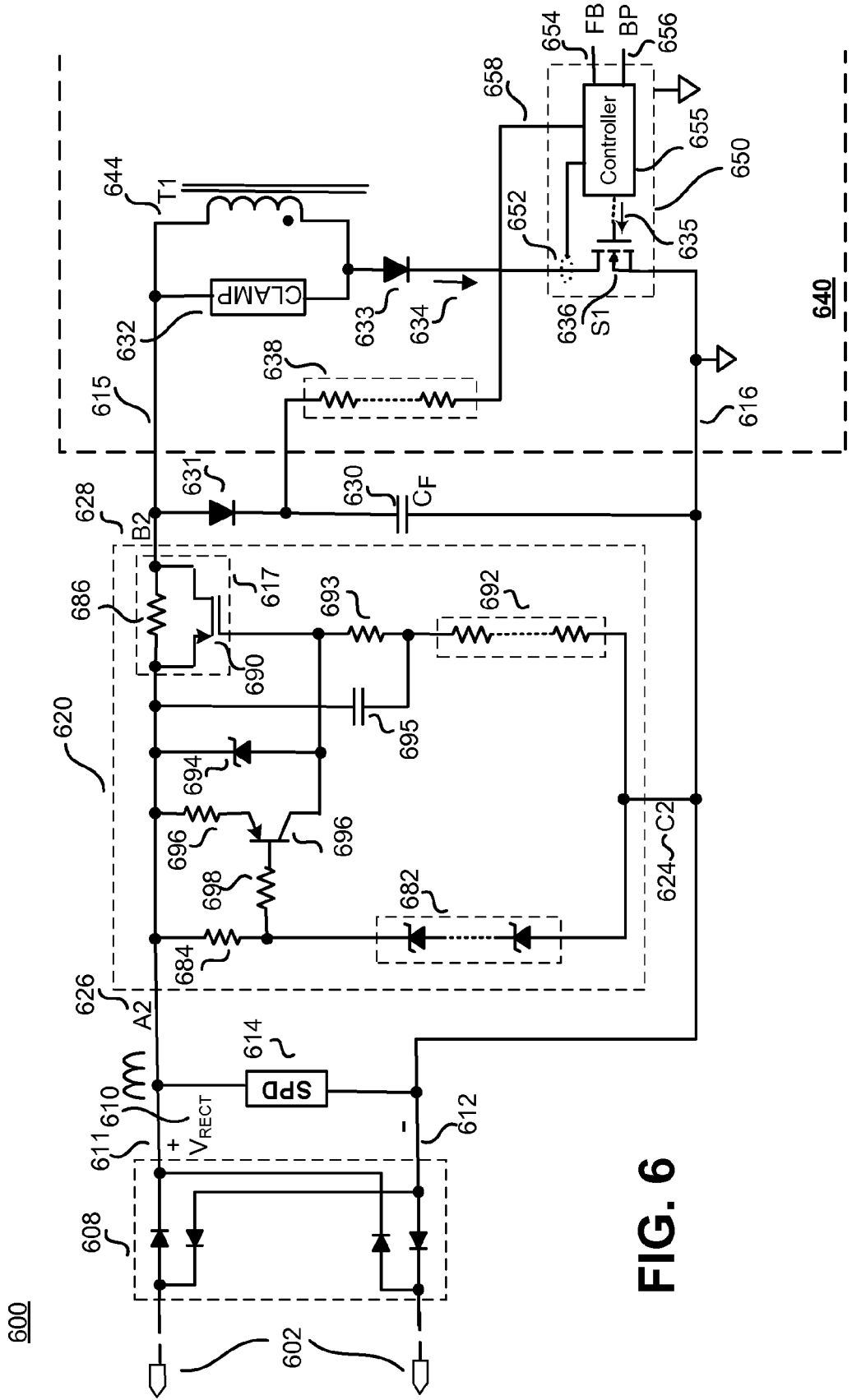
FIG. 6 illustrates a detailed example of internal circuitry of an example active surge protection module included in the high side bus of a power supply in accordance with the teachings of the present invention.

In FIGS. 5 and 6 the internal circuitry of example active surge protection modules for assembly at the low side bus and for assembly at the high side bus are explained, respectively. To simplify, the extra components at the ac input side are not shown and only primary side of the transformer of the switching converter with coupling terminals to the surge protector module are depicted. In addition, it is noted that some extra optional components are shown in comparison to FIGS. 3 and 4, which may sometime be included in a practical design depending on the application.

Referring specifically now to FIG. 5, an example power supply 500 is illustrated, which includes a rectifier 508 having input terminals 502 to be coupled to receive an ac input signal. Rectifier 508 also includes output terminals 511 and 512, which are coupled to output a rectified dc signal Vrect 510. Power supply 500 also includes a switching converter 540, which includes input terminals 515 and 516, which are coupled to receive the rectified dc signal Vrect 510 from the output terminals 511 and 512 of the rectifier 508. The switching converter 540 also has outputs to be coupled to a load (not shown).

As shown in the depicted example, power supply 500 also includes a surge protection module 520, which includes a terminal A1 526, which is coupled to output terminal 512 of rectifier 508. In addition, surge protection module 520 includes a terminal B1 528 coupled to input terminal 516 of switching converter 540. Furthermore, surge protection module 520 includes a terminal C1 524 coupled to output terminal 511 of rectifier 508 as well as input terminal 515 switching converter 540. In the illustrated example, terminal C1 524 is coupled to output terminal 511 of rectifier 511 and input terminal 515 switching converter 508 through a diode 531 as shown. In the illustrated example, a variable resistance circuit 517 is coupled between the terminal A1 526 and terminal B1 528. In one example, the remainder of the circuitry included within surge protection module 520 may be considered to be control circuitry of surge protection module 520 coupled between terminal A1 526 and terminal C1 524. In the example, the control circuitry within surge protection module 520 is coupled to control the variable resistance circuit 517 such that a resistance of the variable resistance circuit 517 between the terminal A1 526 and terminal B1 528 is responsive to the magnitude of a voltage between terminal A1 526 and terminal C1 524.

For instance, in one example, the resistance of the variable resistance circuit 517 is a first resistance value, such as for example the resistance value of resistor 586, in response to the magnitude of the voltage between the terminal A1 526 and terminal C1 524 being greater than a threshold voltage value. The resistance of the variable resistance circuit 517 is a second resistance value, such as for example the "on" resistance value of switch 590, in response to the magnitude of the voltage between terminal A1 526 and terminal C1 524 being less than the threshold voltage value. In one example, the resistance value of resistor 586 is substantially greater than the "on" resistance value of switch 590, which in one example is substantially equal to zero when switch 590 is in an "on" state.

In the illustrated example, variable resistance circuit 517 includes two paths between terminal A1 526 and terminal B1 528. As shown, the first path between terminal A1 526 and terminal B1 528 includes resistor 586. The second path includes switch 590. In one example, switch 590 is controlled in response to the control circuitry of surge protection module 520.

In the illustrated example, when there is no voltage spike between output terminals 511 and 512 of the rectifier 508, the magnitude of the voltage between terminal A1 526 and terminal C1 524 is less than the threshold voltage value. When of the magnitude of the voltage between terminal A1 526 and terminal C1 524 is less than the threshold voltage value, the voltage across Zener module 582 is less than the breakdown voltage of Zener module 582, which results in npn transistor 596 being in an "off" state, which results in switch 590 being in an "on" state with the gate of switch 590 being pulled high through resistor module 592. With switch 590 being in an "on" state, current is able to flow through switch 590 from terminal B1 528, through the second path that includes switch 590 having substantially zero resistance, to terminal A1 526.

However, in the illustrated example, when there is a voltage spike between output terminals 511 and 512 of the rectifier 508, the magnitude of the voltage between terminal A1 526 and terminal C1 524 is greater than the threshold voltage value. When of the magnitude of the voltage between terminal A1 526 and terminal C1 524 is greater than the threshold voltage value, the voltage across Zener module 582 is greater than the breakdown voltage of Zener module 582, which results in transistor 596 being turned "on," which results in switch 590 being turned "off" with the gate of switch 590 being pulled low through transistor 596. With switch 590 being turned "off," current from terminal B1 528 is no longer able to flow through switch 590, and therefore must flow through the first path that includes resistor 586 to terminal A1 526. Accordingly, energy from the voltage spike between output terminals 511 and 512 of the rectifier 508 is dissipated across resistor 586 when there is a voltage spike. In one example, resistor 586 is a high power resistor that dissipates the surge energy.

As shown in the illustrated example of FIG. 5, surge protection module 520 is assembled at the low side bus of power supply 500, where the high side bus is coupled to terminals 511 and 515 and the low side bus is coupled to terminals 512 and 516. In the example illustrated in FIG. 5, switch 590 is an N-channel MOSFET, transistor 596 is an npn bipolar junction transistor (BJT), and the Zener module 582 includes a string of one or more diodes, with a cathode terminal coupled to terminal C1 524. In addition, resistor module 592 includes one or more resistors coupled between terminal C1 524 and the gate of switch 590.

With respect to the example switching converter 540 illustrated in FIG. 5, the diode 533 in series with drain of switch S1 536 prevents from any return current through body diode of switch S1 536. In addition, diode 531 in series with the filter capacitor $C_F$ 530 helps to prevent the charge on capacitor $C_F$ from discharging when there is a near zero crossing of the line sinusoidal voltage, which helps to bias transistor 590 and improve current shaping near a zero crossing for improved power factor correction.

In the illustrated example, controller 555 and power switch S1 536 are shown to be integrated into a monolithic integrated circuit 550. As shown, controller 555 receives dc supply at BP 556, a feedback signal at FB 554, a drain current at node 552, and input line data 558 is received through a resistor module 538 across the filter capacitance $C_F$ 530 after diode 531. In the example, the terminal C1 524 of the surge protection module 520 also receives information of the line voltage level and the surge transients. In response to the processing the signals input to the controller 555, controller 555 outputs the drive signal 535 to the gate of S1 536 to control the transfer of energy from the input to the output of power supply 500.

In summary, at normal line voltage levels between terminals 511 and 512, the gate of switch 590, through the resistor module 592 and the Zener module 594, is clamped at a full gate level (full bias). The switch 590 remains closed and return current from terminal B1 528 of the surge protection module 520 passes through the low "on" resistance of switch 590 to the terminal A1 526. In the event of any excessive voltage spikes or surges at terminal C1 524, the Zener module 582 breaks down and the reverse current of Zener module 582 through resistors 584 and 598 provides bias current for the transistor 596 to provide a short circuit across the Zener diode 594. By short circuiting Zener diode 594 and pulling down the gate of transistor switch 590, the path through switch 590 opens and forces the surge high energy current through the dissipative resistance to dissipate the surge energy in accordance with the teachings of the present invention.

It is appreciated that FIG. 6 shares similarities with FIG. 5 and presents the internal sample components and terminal couplings of an active surge protection module 620 for assembly at high side bus. For instance, referring specifically now to FIG. 6, an example power supply 600 is illustrated, which includes a rectifier 608 having input terminals 602 coupled to receive an ac input signal. Rectifier 608 also includes output terminals 611 and 612, which are coupled to output a rectified dc signal Vrect 610. Power supply 600 also includes a switching converter 640, which includes input terminals 615 and 616, which are coupled to receive the rectified dc signal Vrect 610 from the output terminals 611 and 612 of the rectifier 608. The switching converter 640 also has outputs to be coupled to a load (not shown).

As shown in the depicted example, power supply 600 also includes a surge protection module 620, which includes a terminal A2 626, which is coupled to output terminal 611 of rectifier 608. In addition, surge protection module 620 includes a terminal B2 628 coupled to input terminal 615 of switching converter 640. Furthermore, surge protection module 620 includes a terminal C2 624 coupled to output terminal 612 of rectifier 608 as well as input terminal 616 switching converter 640. In the illustrated example, a variable resistance circuit 617 is coupled between the terminal A2 626 and terminal B2 628. In one example, the remainder of the circuitry included within surge protection module 620 may be considered to be control circuitry of surge protection module 620 that is coupled between terminal A2 626 and terminal C2 624. In the example, the control circuitry within surge protection module 620 is coupled to control the variable resistance circuit 617 such that a resistance of the variable resistance circuit 617 between the terminal A2 626 and terminal B2 628 is responsive to the magnitude of a voltage between terminal A2 626 and terminal C2 624.

For instance, in one example, the resistance of the variable resistance circuit 617 is a first resistance value, such as for example the resistance value of resistor 686, in response to the magnitude of the voltage between the terminal A2 626 and terminal C2 624 being greater than a threshold voltage value. The resistance of the variable resistance circuit 617 is a second resistance value, such as for example the "on" resistance value of switch 690, in response to the magnitude of the voltage between terminal A2 626 and terminal C2 624 being less than the threshold voltage value. In one example, the resistance value of resistor 686 is substantially greater than the "on" resistance value of switch 690, which in one example is substantially equal to zero when switch 690 is in an "on" state.

In the illustrated example, variable resistance circuit 617 includes two paths between terminal A2 626 and terminal B2 628. As shown, the first path between terminal A2 626 and terminal B2 628 includes resistor 686. The second path includes switch 690. In one example, switch 690 is controlled in response to the control circuitry of surge protection module 620.

In the illustrated example, when there is no voltage spike between output terminals 611 and 612 of the rectifier 608, the magnitude of the voltage between terminal A2 626 and terminal C2 624 is less than the threshold voltage value. When of the magnitude of the voltage between terminal A2 626 and terminal C2 624 is less than the threshold voltage value, the voltage across Zener module 682 is less than the breakdown voltage of Zener module 682, which results in pnp transistor 696 being in an "off" state, which results in switch 690 being in an "on" state with the gate of switch 690 being pulled low through resistor module 692 and resistor 693. With switch 690 being in an "on" state, current is able to flow through switch 690 from terminal A2 626, through the second path that includes switch 690 having substantially zero resistance, to terminal B2 628.

However, in the illustrated example, when there is a voltage spike between output terminals 611 and 612 of the rectifier 608, the magnitude of the voltage between terminal A2 626 and terminal C2 624 is greater than the threshold voltage value. When the magnitude of the voltage between terminal A2 626 and terminal C2 624 is greater than the threshold voltage value, the voltage across Zener module 682 is greater than the breakdown voltage of Zener module 682, which results in biasing transistor 696 to be turned "on," which in turn results in switch 690 being turned "off" with the gate of switch 690 being pulled high through transistor 696. With switch 690 being turned "off," current from terminal A2 626 is no longer able to flow through switch 690, and therefore must flow through the first path that includes resistor 686 to terminal B2 628. Accordingly, energy from the voltage spike between output terminals 611 and 612 of the rectifier 608 is dissipated across resistor 686 when there is a voltage spike. In example, resistor 686 is a high power resistor that dissipates the surge energy.

As shown in the illustrated example of FIG. 6, surge protection module 620 is assembled at the high side bus of power supply 600, where the high side bus is coupled to terminals 611 and 615 and the low side bus is coupled to terminals 612 and 616. In the example illustrated in FIG. 6, switch 690 is a P-channel MOSFET, transistor 696 is a pnp bipolar transistor, and the Zener module 682 includes a string of one or more Zener diodes, with an anode terminal coupled to terminal C2 624. In addition, resistor module 692 includes one or more resistors coupled between terminal C2 624 and the gate of switch 690.

With respect to the example switching converter 640 illustrated in FIG. 6, the diode 633 in series with drain of switch S1 636 prevents from any return current through body diode of switch S1 636. In addition, diode 631 in series with the filter capacitor $C_F$ 630 helps to prevent the charge on capacitor $C_F$ from discharging when there is a near zero crossing of the line sinusoidal voltage, which helps to bias transistor 690 and improve current shaping near a zero crossing for improved power factor correction.

In the illustrated example, controller 655 and power switch S1 636 are shown to be integrated into a monolithic integrated circuit 650. As shown, controller 655 receives dc supply at BP 656, a feedback signal at FB 654, a drain current at node 652, and input line data 658 is received through a resistor module 638 across the filter capacitance $C_F$ 630 after diode 631. In response to the processing the signals input to the controller 655, controller 655 outputs the drive signal 635 to the gate of S1 636 to control the transfer of energy from the input to the output of power supply 600.

In summary, at normal line voltage levels through resistor module 692, resistor 693, and Zener diode 694, the gate switch 690 is clamped at a voltage level lower than the source and the P-channel transistor switch 690 is fully biased to be turned "on" with a low "on" resistance current path provided from terminal A2 626 to the terminal B2 628 of the surge protection module 620. In the event of any excessive voltage spikes or surges on terminal A2 626 to terminal C2 624, the Zener module 682 breaks down and the reverse current through resistor 684 biases the pnp bipolar junction transistor 696 through resistors 696 and 698 to provide an alternate path across Zener diode 694, which pulls up the gate of switch 690 to turn off switch 690 and force the high energy surge current through the dissipative resistance 686 to dissipate the surge energy in accordance with the teachings of the present invention.

In the illustrated example of FIG. 6, it is noted that the capacitance 695 and resistance 693 serve to provide efficient operation at low voltage levels near zero crossings of the line half-sine cycles, a similar purpose as that of the coupling of diode 531 at terminal C1 524 in FIG. 5, to capacitance 530, It is appreciated that the presented internal circuit and the components shown for the implementation examples were used as examples for the purpose of describing the operation and there may be other ways and other circuitry with detailed extra components that could be covered under the general concept of this application.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A surge protection module, comprising:
a first terminal coupled to a first output terminal of a rectifier of a power supply;
a second terminal coupled to a first input terminal of a switching converter of the power supply;
a third terminal coupled to a second output terminal of the rectifier and a second input terminal of the switching converter;
a variable resistance circuit coupled between the first and second terminals; and
a control circuit coupled between the first and third terminals and coupled to control the variable resistance circuit, wherein a resistance of the variable resistance circuit is responsive to a magnitude of a voltage between the first and third terminals.

2. The surge protection module of claim 1 wherein the variable resistance circuit comprises:
a first path having a first resistance coupled between the first and second terminals;
a second path having a second resistance coupled between the first and second terminals, wherein the first resistance is greater than the second resistance; and
a switch included in the second path and coupled to be controlled in response to the control circuit.

3. The surge protection module of claim 2 wherein the control circuit is coupled to control the switch to be OFF in response to the magnitude of the voltage between the first and third terminals being greater than a threshold voltage value and wherein the control circuit is coupled to control the switch to be ON in response to the magnitude of the voltage between the first and third terminals being less than the threshold voltage value.

4. The surge protection module of claim 2 wherein the second resistance is substantially equal to zero.

5. The surge protection module of claim 2 wherein the control circuit comprises a transistor coupled between a control terminal of the switch and the first terminal, wherein the transistor is coupled to control the switch to be OFF in response to the magnitude of the voltage between the first and third terminals being greater than a threshold voltage value and wherein the transistor is coupled to control the switch to be ON in response to the magnitude of the voltage between the first and third terminals being less than the threshold voltage value.

6. The surge protection module of claim 5 wherein the control circuit further comprises a Zener module coupled between the third terminal and a control terminal of the transistor, wherein the Zener module is coupled to control the transistor to be ON in response to the magnitude of the voltage between the first and third terminals being greater than the threshold voltage value and wherein the Zener module is coupled to control the transistor to be OFF in response to the magnitude of the voltage between the first and third terminals being less than the threshold voltage value.

7. The surge protection module of claim 6 wherein the first output terminal of the rectifier and the first input terminal of the switching converter are coupled to a low side bus of the power supply and the second output terminal of the rectifier and the second input terminal of the switching converter are coupled to a high side bus of the power supply.

8. The surge protection module of claim 7 wherein the switch comprises an N-channel MOSFET, the transistor comprises a npn bipolar junction transistor, and the Zener module comprises a cathode terminal coupled to the third terminal.

9. The surge protection module of claim 6 wherein the first output terminal of the rectifier and the first input terminal of the switching converter are coupled to a high side bus of the power supply and the second output terminal of the rectifier and the second input terminal of the switching converter are coupled to a low side bus of the power supply.

10. The surge protection module of claim 9 wherein the switch comprises a P-channel MOSFET, the transistor comprises a pnp bipolar junction transistor, and the Zener module comprises an anode terminal coupled to the third terminal.

11. The surge protection module of claim 1 wherein the third terminal is coupled to the second output terminal of the rectifier and the second input terminal of the switching converter through a diode.

12. A power supply, comprising;
a rectifier having first and second inputs coupled to receive an ac input signal, the rectifier having first and second outputs to output a rectified dc signal;
a switching converter having first and second inputs coupled to receive the rectified dc signal from the first and second outputs of the rectifier, the switching converter having first and second outputs to be coupled to a load; and
a variable resistance circuit coupled between the first output terminal of the rectifier and the first input terminal of the switching converter; and
a control circuit coupled between the first and second output terminals of the rectifier and coupled to control the variable resistance circuit, wherein a resistance of the variable resistance circuit is responsive to a magnitude of a voltage between the first and second output terminals of the rectifier.

13. The power supply of claim 12 wherein the resistance of the variable resistance circuit is a first resistance value in response to the magnitude of the voltage between the first and second output terminals of the rectifier being greater than a threshold voltage value and wherein the resistance of the variable resistance circuit is a second resistance value in response to the magnitude of the voltage between the first and second output terminals of the rectifier being less than the threshold voltage value, wherein the first resistance value is greater than the second resistance value.

14. The power supply of claim 13 wherein the second resistance is substantially equal to zero.

15. The power supply of claim 12 wherein the variable resistance circuit comprises:
a first path having a first resistance coupled between the first output terminal of the rectifier and the first input terminal of the switching converter;
a second path having a second resistance coupled between the first output terminal of the rectifier and the first input terminal of the switching converter, wherein the first resistance is greater than the second resistance; and
a switch included in the second path and coupled to be controlled in response to the control circuit.

16. The power supply of claim 15 wherein the control circuit is coupled to control the switch to be OFF in response to the magnitude of the voltage the first and second output terminals of the rectifier being greater than a threshold voltage value and wherein the control circuit is coupled to control the switch to be ON in response to the magnitude of the voltage between the first and second output terminals of the rectifier being less than the threshold voltage value.

17. The power supply of claim 15 wherein the second resistance is substantially equal to zero.

18. The power supply of claim 15 wherein the control circuit comprises a transistor coupled between a control terminal of the switch and the first output terminal of the rectifier, wherein the transistor is coupled to control the switch to be OFF in response to the magnitude of the voltage between the first and second terminals of the rectifier being greater than a threshold voltage value and wherein the transistor is coupled to control the switch to be ON in response to the magnitude of the voltage between the first and second terminals of the rectifier being less than the threshold voltage value.

19. The power supply of claim 18 wherein the control circuit further comprises a Zener module coupled between the second terminal of the rectifier and a control terminal of the transistor, wherein the Zener module is coupled to control the transistor to be ON in response to the magnitude of the voltage between the first and second terminals of the rectifier being greater than the threshold voltage value and wherein the Zener module is coupled to control the transistor to be OFF in response to the magnitude of the voltage between the first and second terminals of the rectifier being less than the threshold voltage value.

20. The power supply of claim 19 wherein the first output terminal of the rectifier and the first input terminal of the switching converter are coupled to a low side bus of the power supply and the second output terminal of the rectifier and the second input terminal of the switching converter are coupled to a high side bus of the power supply.

21. The power supply of claim 19 wherein the first output terminal of the rectifier and the first input terminal of the switching converter are coupled to a high side bus of the power supply and the second output terminal of the rectifier and the second input terminal of the switching converter are coupled to a low side bus of the power supply.

22. A surge protection module, comprising:
a first terminal coupled to a first output terminal of a rectifier of a power supply;
a second terminal coupled to a first input terminal of a switching converter of the power supply;
a third terminal coupled to a second output terminal of the rectifier and a second input terminal of the switching converter;
a variable resistance circuit coupled between the first and second terminals; and
a control circuit coupled between the first and third terminals and coupled to control the variable resistance circuit, wherein a resistance of the variable resistance circuit is responsive to a magnitude of a voltage between the first and third terminals, wherein the resistance of the variable resistance circuit is a first resistance value in response to the magnitude of the voltage between the first and third terminals being greater than a threshold voltage value and wherein the resistance of the variable resistance circuit is a second resistance value in response to the magnitude of the voltage between the first and third terminals being less than the threshold voltage value, wherein the first resistance value is greater than the second resistance value.

23. The surge protection module of claim 22 wherein the second resistance is substantially equal to zero.

* * * * *